H. D. KELLY.
MEASURING FAUCET.
APPLICATION FILED JUNE 30, 1915.

1,226,081.

Patented May 15, 1917.
2 SHEETS—SHEET 1.

Witness
Frank R. Glore
K. M. Thorp

Inventor
H. D. Kelly
By George F. Thorp
Attorney

H. D. KELLY.
MEASURING FAUCET.
APPLICATION FILED JUNE 30, 1915.

1,226,081.

Patented May 15, 1917.
2 SHEETS—SHEET 2.

Witnesses
Frank R. Glore
K. M. Thorpe

Inventor
H. D. Kelly
By George F. Thorpe
Attorney

UNITED STATES PATENT OFFICE.

HENRY D. KELLY, OF KANSAS CITY, MISSOURI.

MEASURING-FAUCET.

1,226,081. Specification of Letters Patent. Patented May 15, 1917.

Application filed June 30, 1915. Serial No. 37,156.

*To all whom it may concern:*

Be it known that I, HENRY D. KELLY, a citizen of the United States, residing at Kansas City, in the county of Jackson and State of Missouri, have invented certain new and useful Improvements in Measuring-Faucets, of which the following is a specification.

This invention relates to measuring faucets, and has for its objects to produce a faucet by which a measured quantity of hot or cold milk can be instantly discharged into a receptacle, such as a mug or glass; by which every quantity discharged shall be of like temperature and quality; and by which there is no loss or waste by drippage.

With these objects in view the invention consists in certain novel and peculiar features of construction and combination of parts as hereinafter described and claimed; and in order that it may be fully understood, reference is to be had to the accompanying drawing, in which:—

Figure 1:
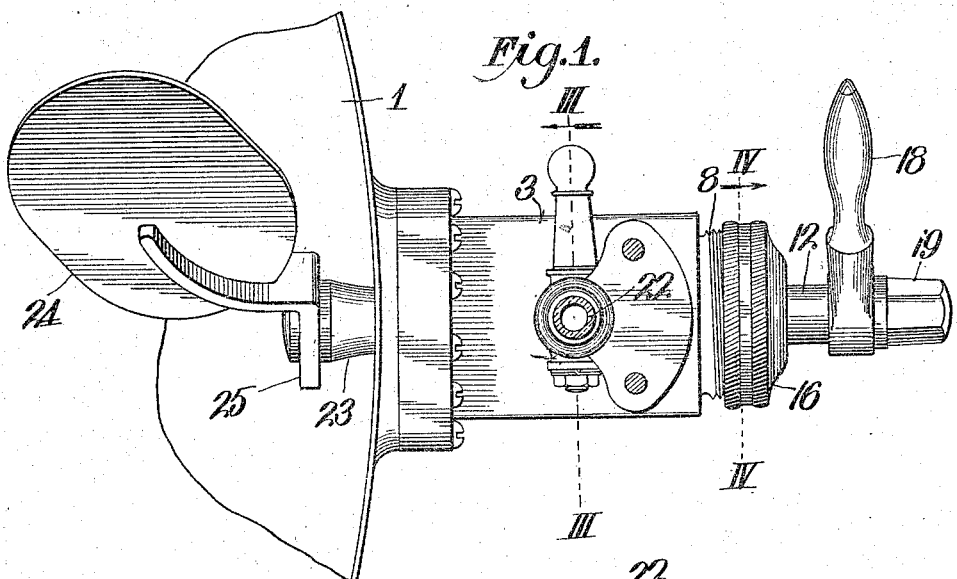
Figure 1, is a fragmentary plan view of an urn equipped with a faucet embodying my invention.

In the said drawing, 1 is an urn of any suitable type having an elongated opening 2 in its wall.

A faucet casing 3 is secured to the exterior side of the urn over opening 2, and is provided with a tapering plug passage 4, an overlying chamber 5, port 6 connecting said chamber and passage, and a discharge spout 7 for the latter.

Surrounding the outer or forward end of the passage is an externally threaded circular flange 8, from which projects forwardly a pair of stop lugs 9.

Figure 2:
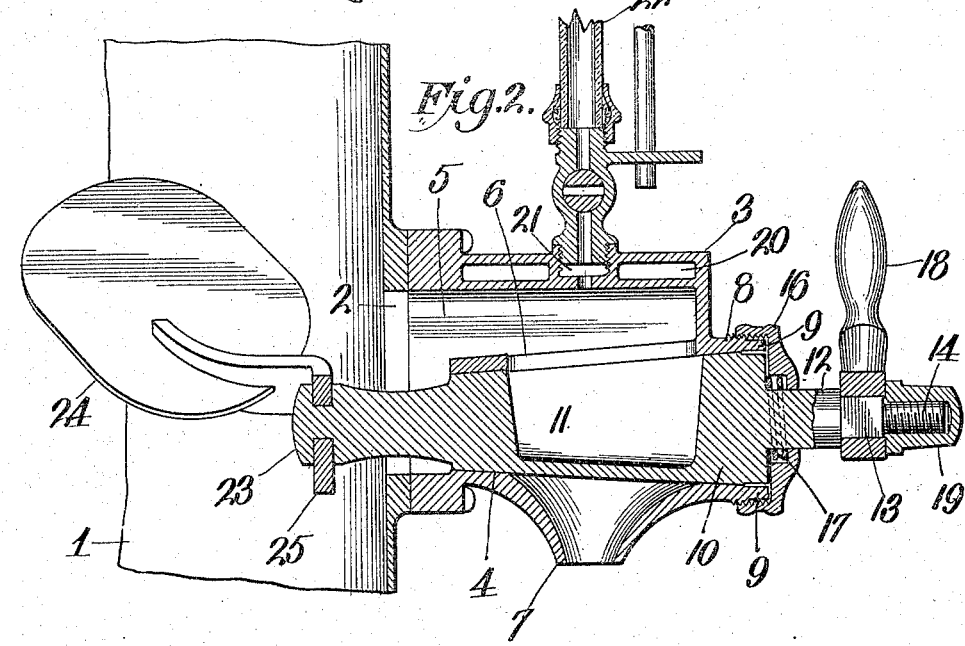
Fig. 2, is a central vertical section of a part of an urn equipped with a faucet embodying my invention.
Figure 3:
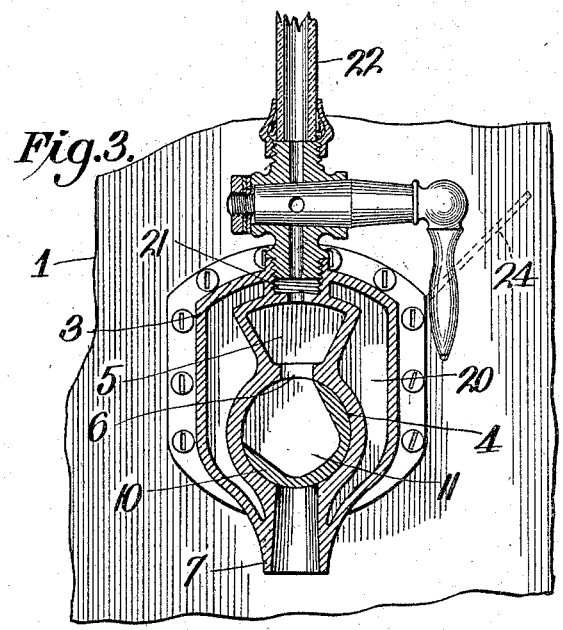
Fig. 3, is a cross section taken on the line III—III of Fig. 1.
Figure 4:
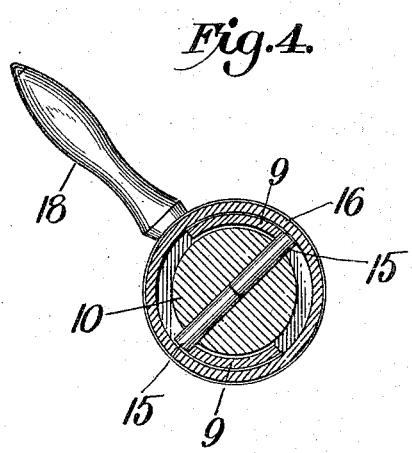
Fig. 4, is a cross section on the line IV—IV of Fig. 1.

A tapering plug valve 10, fits in the passage 4, and is provided with a chamber 11, which is the measure of the quantity of milk delivered by the faucet, this chamber being normally in communication with port 6, as shown in Figs. 2 and 3, and adapted for communication with the spout 7, when the faucet is operated to discharge the measured quantity of milk, as indicated by dotted lines, Fig. 3.

The valve has an outer cylindrical extension or stem 12, having a squared portion 13 and a threaded end 14, and also a pair of radial pins 15, between opposite ends of the stop lugs, said pins by contact with said lugs alternately limiting the rotation or oscillation of the plug to a quarter revolution. An internally threaded cap 16, fits around the cylindrical stem and is screwed upon the threaded flange, a coiled spring 17 upon the stem, being interposed between the cap and the outer end of the plug to clamp the same firmly though yieldingly within the passage 4, so that no milk can pass from the urn into said passage except by way of port 6.

A handle 18 fits on the squared portion of the stem, and is held in position by a screw cap 19. The casing is provided with a dead air or vacuum chamber 20, around the chamber 5, and the greater part of the plug passage 4, to maintain said chamber and passage and have the milk in the former and in the chamber of the valve, at the same temperature as that in the urn, said dead air or vacuum chamber acting to exclude cold or heat accordingly as the urn is charged with hot or chilled milk.

The casing has a threaded socket 21, in communication with the charging chamber 5, and with the lower end of a glass tube 22, through which steam may be forced from the urn into the faucet and chamber of the faucet plug for cleansing and sterilizing purposes.

To insure that each charge of milk delivered by the faucet, is of uniform quality with that in the urn, the plug is provided with a stem 23, projecting into the urn through the opening 2 thereof, and carrying an agitator or stirrer 24, which is oscillated each time the faucet is opened and closed, which in a restaurant, where such urns are commonly employed, is of great frequency.

For convenience, the agitator or stirrer has a bifurcated arm 25, engaging opposite grooves in the stem 23 of the plug, the parts being so arranged that the agitator or stirrer always projects upwardly from the stem and hence cannot become dislodged therefrom during the operation of the faucet.

It will be seen that when the faucet is closed the plug chamber stands charged with milk and that the discharge is instantaneous upon the opening of the faucet, as no time is lost awaiting the filling of the plug chamber, it being also noted that the chamber 5 fills as the discharge occurs.

It will also be noted that no overcharge can take place because the port 6 is closed before the discharge through the spout begins. It will further be noted that in the closing of the faucet, the spout is closed before the recharging of the plug chamber begins, but that the recharging of said chamber is finished by the time the closing movement of the plug ends. It will thus be seen that the faucet can be used to effect the discharge of measured quantities of milk in rapid succession and that waste by dripping cannot occur.

It will also be noted that by using a discharge spout of large capacity no air vent is necessary to the rapid and successful operation of the valve, as any air entering the spout will find its way into the urn and prevent the production of a vacuum therein. By removing the agitator or stirrer and unscrewing the cap, the plug can be withdrawn from the faucet to facilitate cleansing operations.

From the above description, it will be apparent that I have produced a simple and efficient faucet embodying the features of advantage enumerated as desirable in the statement of the object of the invention, and while I have illustrated my preferred embodiment of the invention, it is obviously susceptible of modification without departing from the principle of construction involved as expressed in the appended claims.

I claim:

1. A faucet provided with a charging chamber, a plug passage, a port connecting the chamber and passage and a spout for and below said passage, a plug fitting rotatably in said passage and provided with a measuring chamber for alternate communication with the said port and spout; said plug having a stem projecting from its inner end, an agitator detachable on the stem, and a handle for operating the plug and agitator.

2. A faucet provided with a charging chamber, a plug-passage, a port connecting the chamber and passage and a spout for and below said passage, a plug fitting said passage and provided with a measuring chamber for alternate communication with the said port and spout; said plug having a stem projecting from its inner end and formed with grooves in its opposite sides, an agitator or stirrer provided with a bifurcated arm for engaging said grooves of the plug-stem, and a handle for oscillating the plug and agitator or stirrer.

In testimony whereof, I affix my signature, in the presence of two witnesses.

HENRY D. KELLY.

Witnesses:
 DENIS J. DOWNEY,
 G. Y. THORPE.

Copies of this patent may be obtained for five cents each, by addressing the "Commissioner of Patents, Washington, D. C."